(No Model.)
F. J. HAWLEY.
FRUIT BASKET.
No. 464,565. Patented Dec. 8, 1891.
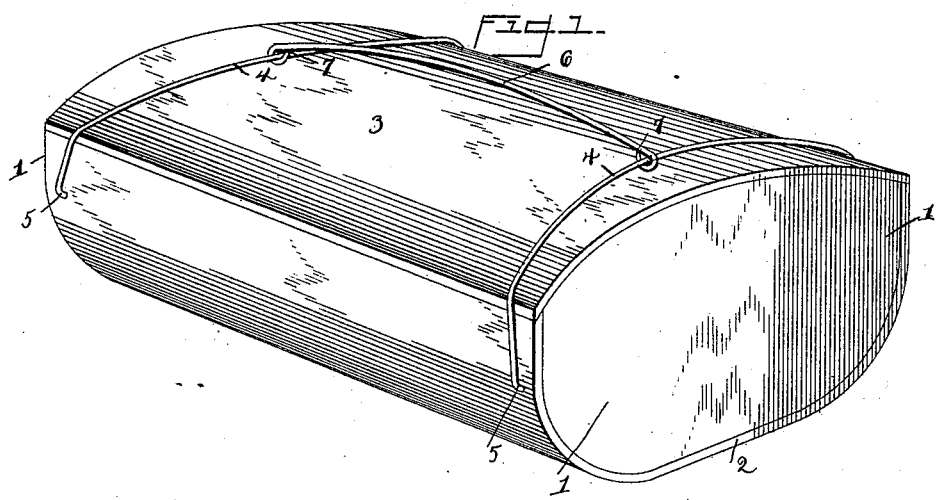
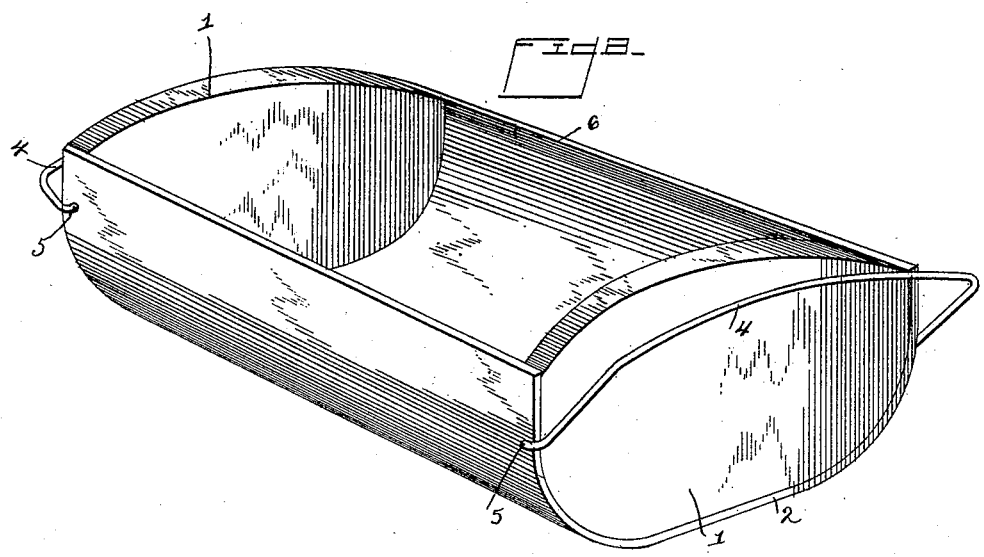
Witnesses:
Chas. A. Ford.
W. S. Duvall.
Inventor
Frank J. Hawley.
By his Attorneys,
C. A. Snow & Co.

UNITED STATES PATENT OFFICE.

FRANK J. HAWLEY, OF PHELPS, NEW YORK.

FRUIT-BASKET.

SPECIFICATION forming part of Letters Patent No. 464,565, dated December 8, 1891.

Application filed April 18, 1891. Serial No. 389,441. (No model.)

*To all whom it may concern:*

Be it known that I, FRANK J. HAWLEY, a citizen of the United States, residing at Phelps, in the county of Ontario and State of New York, have invented a new and useful Fruit-Basket, of which the following is a specification.

My invention relates to improvements in baskets of that class designed to receive small fruits during transportation and while placed on sale.

Heretofore difficulty has been observed in preventing the settling of the fruit during transportation, and consequently, though the baskets may be filled completely at the time of shipment, by the time the same reaches its destination the small fruit has taken into the various corners and thus gives the basket the appearance of being only partially filled, thus affecting seriously the salability of the fruit. A further objection has arisen from the fact that by reason of the flat covers usually employed drippings from crates above during shipment fall upon the fruit below and spoil the same.

The object therefore of my invention is to overcome the above disadvantages now existing and to produce a cheap, simply-constructed, readily-packed, and attractive basket for exhibiting purposes, and secure certain other advantages hereinafter more apparent.

With the above objects in view the invention consists in certain features of construction hereinafter specified, and particularly pointed out in the claims.

Referring to the drawings, Figure 1 is a perspective of a fruit-basket constructed in accordance with my invention. Fig. 2 is a similar view, the cover being removed.

Like numerals of reference indicate like parts in both the figures of the drawings.

In practicing my invention I construct the basket preferably of wood and in the following specified manner.

1 designates the opposite end walls or pieces of the basket, and the same upon their upper edges are provided with a slight curve, as shown. The centers of the lower edges of the end walls are flat, while from points at each side of the centers to the upper corners of the end walls said walls are slightly curved, as shown, whereby no corners are formed in the bottom of the basket. To the edges and bottom of the walls 1 is tacked or otherwise secured the bottom 2, which it will be observed partakes exactly of the contour of the end wall, and therefore has the flat bottom portion and the curved sides.

3 designates the cover, and the same is curved slightly to lie flat upon the upper edges of the end walls, the curvature of the cover agreeing exactly with said edges and therefore designed to shed any moisture, drippings, &c., that may fall thereon and prevent the same from gaining access to the contents of the basket or settling upon the cover. If desired, the cover may be fastened upon the basket in any ordinary way—that is, by nails, wire, or cord ties, fastening-straps, &c.; but I have herein illustrated a cheap and simple as well as effective manner for accomplishing such securements. The means herein devised consists of a pair of inverted and what might be termed "U-shaped" locking-bails 4, the extremities of which are inwardly bent, as at 5, and driven into the sides of the basket, thus leaving the intermediate portions of the bails to be swung over the cover when the latter is in position upon the basket, so that said cover is prevented from movement. These bails are preferably formed of spring-wire, and after being sprung into position will be found quite secure. For the purpose, however, of increasing when necessary the security of the bails I provide a locking-bail 6, also formed of spring-wire and slightly curved. The bail 6 is provided with hooks 7 at its ends, said hooks being secured by reason of the bending of the bail, and when the swinging bails are in position these hooks are introduced into connection with the same by simply flattening the locking-bail and subsequently releasing the same, so that not only are the swinging bails prevented from spreading or slipping off the ends of the cover, but the locking-bail serves as a convenient handle, which may be readily grasped by the hand and thus the basket carried. It will be observed that I avoid the usual four lower corners of the baskets of this class, and that the fruit when first placed in the same will readily fall or settle as far as possible. It will be also observed that the cover may be unlocked and removed for inspecting the fruit and the same replaced with the same fasteners, which may be used over and over again indefinitely.

Having described my invention, what I claim is—

1. The combination, with a basket having a curved detachable cover, of opposite inverted-U-shaped spring locking-bails having their terminals inwardly bent and taking in the sides of the basket and adapted to swing over and fit upon said curved cover, and a curved spring locking-bail terminating in hooks and adapted to be compressed, whereby its hooks may be distended for engaging the swinging bails and locking the same together, substantially as specified.

2. The combination, with the fruit-basket having the independent removable curved top, of the opposite curved bails 4, pivoted to the sides of the basket and adapted to be swung over upon and lock the curved top, substantially as specified.

In testimony that I claim the foregoing as my own I have hereto affixed my signature in presence of two witnesses.

FRANK J. HAWLEY.

Witnesses:
LULU E. CLAYTON,
JOSEPH C. CLAYTON.